United States Patent [19]

Pagenkopf et al.

[11] Patent Number: 5,738,222
[45] Date of Patent: Apr. 14, 1998

[54] PROCESS FOR SEPARATING SOLIDS MIXTURES OF DIFFERING DENSITY, SEPARATING LIQUID AND DEVICE FOR IMPLEMENTING THE PROCESS

[75] Inventors: Ingeborg Pagenkopf, Gülzower Strasse 45, D-12619 Berlin; Manfred Allies, Berlin, both of Germany

[73] Assignee: Ingeborg Pagenkopf

[21] Appl. No.: 505,238

[22] PCT Filed: Mar. 17, 1994

[86] PCT No.: PCT/DE94/00313

§ 371 Date: Aug. 9, 1995

§ 102(e) Date: Aug. 9, 1995

[87] PCT Pub. No.: WO94/21382

PCT Pub. Date: Sep. 29, 1994

[30] Foreign Application Priority Data

Mar. 18, 1993 [DE] Germany ............... 43 09 325.6
Mar. 18, 1993 [DE] Germany ............... 43 09 326.4

[51] Int. Cl.⁶ .................................................. B03B 1/00
[52] U.S. Cl. ..................... 209/7; 209/12.1; 209/172.5; 209/930
[58] Field of Search ......................... 209/2, 3, 4, 7, 209/9, 172, 172.5, 173, 930, 12.1

[56] References Cited

U.S. PATENT DOCUMENTS

| | | | |
|---|---|---|---|
| 1,854,107 | 9/1932 | Chance | 209/172.5 |
| 2,266,840 | 12/1941 | Alexander et al. | 209/172 |
| 5,246,115 | 9/1993 | Vezzoli et al. | 209/172 X |
| 5,268,128 | 12/1993 | Lahoda et al. | 209/2 X |

FOREIGN PATENT DOCUMENTS

| | | |
|---|---|---|
| 0 469 904 | 2/1992 | European Pat. Off. . |
| 2104667 | 4/1972 | France . |
| 29 00 666 | 7/1980 | Germany . |
| 33 05 517 | 8/1984 | Germany . |
| 38 00 204 | 7/1989 | Germany . |
| 4320283 | 1/1994 | Germany .................. 209/172.5 |
| 59-196760 | 11/1984 | Japan . |
| 2001689 | 10/1993 | U.S.S.R. .................. 209/172.5 |
| 1568749 | 6/1980 | United Kingdom . |

OTHER PUBLICATIONS

Härdtle et al, Müll und Abfall (Refuse and Waste), Supplement 27, Berlin 1991, p. 33.

von Essen, U. "Plastics Recycling Practice", published by TÜV Rheinland GmbH, Cologne 1993, chap. 8.2, pp. 3–5.

Gottesman, R.T. The Vinyl Institute, USA IUPAC Internat. Sympos. Recycling of Polymers, Marbella 1991.

*Primary Examiner*—William E. Terrell
*Assistant Examiner*—Tuan N. Nguyen
*Attorney, Agent, or Firm*—Collard & Roe, P.C.

[57] ABSTRACT

A process for separating mixtures of solids of different density, uses a separating liquid and a device for implementing the process. The process is especially suitable for the analysis and technical preparation of waste plastics, glass and electrical scrap. In the process, a reduced mixture of solids with a particle size of 0.1 to 80 mm are brought successively into contact with solutions of separating liquids of differing density in steps of 0.005 to 0.1 g/cm³ within a selected range from that between 0.8 and 2.9 g/cm³ and the floating or sinking solid components are separated after each step. The separating liquid in the density range between 1 and 2.9 is preferably an aqueous solution of an alkali metal salt or an alkaline earth metal salt of metatungstate with a concentration in the range 1 to 80 weight % and an oxidant selected from the chromate, dichromate, permanganate, nitrate, peracid and perester group with a concentration of 0.05 to 0.5 weight %.

12 Claims, 8 Drawing Sheets

PROCESS FOR SEPARATING SOLIDS MIXTURES OF DIFFERING DENSITY, SEPARATING LIQUID AND DEVICE FOR IMPLEMENTING THE PROCESS

BACKGROUND OF THE INVENTION

1. Field of the Invention

The invention relates to a process for separating solids mixtures of differing density, a separating liquid and a device for implementing the process. The process is above all suitable for the analysis and technical separation of waste products belonging to the group of plastics, glass and electrical scrap.

2. The Prior Art

When recovering recyclable products from mixtures of waste, separation and grading are the first processing stages. Mixtures containing differing amounts of materials of the most diverse nature have to be classified in separation processes. Of all the problems which exist at the start of recycling processes, obtaining information regarding the separability of waste mixtures and determining the useful material content are basic prerequisites for cost-effective plant operation. For said reason, besides developing and refining separation processes it is just as essential to find a way of controlling the selectivity of separation and determining the concentration of useful materials throughout all of the processing stages. There are currently on the market no process-accompanying measuring methods or devices which allow recycling plants to be operated with a view to selectivity of separation and concentration of plastics materials.

Up till now, determining the useful material content in waste mixtures has been effected by manual separation followed by grading analysis in the case of waste assessment (Härdtle, G., Marek, K., Bilitewski, B., Kijewski, K., "Recycling of plastics waste" Berlin: E. Schmidt, 1991, supplement 27 of MÜLL UND ABFALL (Refuse and Waste), p.33) or by the costly method of manual separation and grading in the form of useful material assessment in the case of electrical and electronic scrap, car recycling (von Essen, U. "Plastics Recycling Practice", published by TÜV Rheinland GmbH, Cologne 1993, chapter 8.2, p. 3–5).

The use of automatic sorting systems to separate PVC and PET bottles on the basis of X-ray fluorescent analysis (identification of PVC) in the USA (Gottesman, R. T., The Vinyl Institute, USA, IUPAC Internat. Sympos. Recycling of Polymers, Marbella 1991, Separation of PVC and PET and other plastic using automatic sortation devices). The degree of purity of PET is however unsatisfactory, so that after automatic sorting a flotation process is required to achieve separation into pure grades.

The previous analytical processes for the separation of plastics mixtures may be used only for input assessment prior to the comminution processing stage. The required process-accompanying analysis and evaluation of the useful material concentration cannot be effected in said manner because an isolation after comminution is technologically no longer possible to achieve and a sample cross-section is not meaningful unless the mass flows are known.

A method of separating materials according to their density, which has already been used in practice, involves the use of heavy and dense media. The principle of said method is that a heavy or dense medium is adjusted to a specific desired density. Aqueous solid suspensions are commonly used for said purpose. Such dense media are used to separate ore and gangue, the material to be separated being split into a floating and a sinking component. Adjustment of the density of the dense media is effected by introducing disperse solid additives into water. The solid additives used are ferrosilicon, also PbS (galenite), iron sulphate (magnetite), barium sulphate, quartz sand, pyrite.

From U.S. Pat. No. 2,266,840 a device and a method are known for determining the percentage of a mineral such as coal in a mineral product, which may contain coal and ash in differing amounts. The invention may also be translated to other minerals such as ores in a mineral mixture, with zinc chloride being mentioned as a separating liquid.

JP-A-59-196760 relates to the classification of seals made of polypropylene according to the degree of crystallization through density separation in alcohol solutions having densities of 0.893, 0.892 and 0.89 using the sink-float method.

EP-A-469904 discloses the separation of heterogeneous plastics material into homogeneous fractions, in particular PET and PVC. As a swelling agent for the plastics material, solvents such as ketone, DMF, chloridized solvents are used and the density separation at 1 to 1.1 $kg/dm^3$ is effected with water, water/glycol, water/NaCl, water/foamless surface-active agent.

In DE-A-3800204, a separation process for plastics waste using the sink-float technique is described, in which a plurality of containers may be installed one behind the other. As separating agents, aqueous salt solutions and specific organic liquids are generally indicated.

DE-A-2900666 relates to the density separation of plastics by means of successively disposed hydraulic cyclone separators. As separating agents of densities above 1 sodium chloride solutions are used, for densities below 1 mixtures of water and organic liquids are used.

From DE-C-3305517, an aqueous alkaline and/or alkaline-earth metal dihydrogendodecawolframate solution, which constitutes a fast solution in water, is known as a heavy medium. Said solution however is only suitable for separating minerals and rock because, in the presence of metals such as Fe, Cu, Zn, Sn, Pb, Al, Mg and a range of organic compounds, the dihydrogendodecawolframate solution decomposes into blue pulp.

Said process is not reversible so that metal-containing solids mixtures cannot be separated using said solution.

A drawback of said methods is that the high-gravity solid used for density adjustment, despite being extremely disperse, itself subsides. This also limits the use of centrifugal separators to accelerate the process as a whole. As a result of the change in density following sedimentation of the high-gravity solid, the separation process becomes less accurate. The remedy of constantly recirculating the heavy medium using pumps is expensive and causes material wear.

U.S. Pat. No. 1,854,107 describes the separation of coal by means of a washing process using water in a device suitable for said purpose.

GB-A-1568749 relates to the separation of germinated and ungerminated seeds by means of density separation using aqueous sugar or glycerol solutions in a specific device.

FR-A-2104667 relates to a mineral analytical process using a special, automatic separation device.

SUMMARY OF THE INVENTION

The object of the invention is to enable continuous separation of solids mixtures of differing density over a density range of 0.8 to 2.9 $g/cm^3$ and hence both guarantee efficient identification of the products which are to be separated and have been removed and at the same time to provide a device for effecting the separation.

According to the invention, said object is achieved by a process, in which the comminuted and washed solids mixture having a particle size in the range of 0.1 to 80 mm is brought successively into contact with aqueous solutions of separating liquids of differing density in steps of 0.005 g/cm$^3$ to 0.1 g/cm$^3$ within a selected region of the density range of 0.8 to 2.9 g/cm$^3$ and the floating or sinking solid component is removed after each stage. The process is characterized in that the density separation is effected in steps of 0.005 g/cm$^3$ to 0.1 g/cm$^3$ within a selected region of the density range of 0.8 to 2.9 g/cm$^3$, the separating liquid in the density range of 1.01 to 1.16 g/cm$^3$ being a urea solution and/or the separating liquid in the density range of 1.01 to 2.9 being a stabilized heavy-medium solution, comprising (1) an alkaline or alkaline-earth salt of dihydrogendodecawolframate having a concentration in the region of 1 to 80% by weight relative to the total mass, and (2) an oxidant, selected from the chromate, dichromate, permanganate, nitrate, peracids, perester group, having a concentration of 0.05 to 0.5% by weight relative to the quantity of the salt of dihydrogendodecawolframate.

In said process, different separating liquids are also used in different density ranges. A preferred separating liquid in the density range of 0.8 to 0.99 is a $C_1$–$C_5$ alkanol or a mixture of a $C_1$–$C_5$ alkanol with water. Preferred alkanols are methanol, ethanol, propanol and isopropanol.

With the separating liquid in the density range of 1.01 to 1.16 g/cm$^3$, a urea solution, plastics materials such as polystyrene (1.03 to 1.05 g/cm$^3$) and acrylonitrile-butadiene styrene (1.06 to 1.08 g/cm$^3$) may preferably be separated.

A further possibility for the use of a separating liquid is the use of magnesium sulphate solution for the density range of 1.01 to 1.28.

The separating liquid according to the invention for the density range of 1.01 to 2.9 is a stabilized heavy medium for the density separation of metal-containing, non-mineral waste products belonging to the group of plastics, glass and electrical scrap and mixtures thereof and comprises the above-mentioned, stabilized, aqueous solution of an alkaline or alkaline-earth salt of dihydrogendodecawolframate having a concentration in the range of 1 to 80% by weight in relation to the total mass. Preferred alkaline salts of dihydrogendodecawolframate are sodium or lithium salts, preferably sodium dihydrogendodecawolframate. The exact structure of sodium dihydrogendodecawolframate is occasionally indicated differently but it is generally indicated by $Na_6[H_2W_{12}O_{40}]$. For the purposes of the present invention, sodium dihydrogendodecawolframate may be used, in which the ratio of Na:W=6:12 to 3:12, i.e. besides the "pure" compound, other type-related polycompounds of a similar structure may be present in a specific amount. What is crucial, however, is that the sodium dihydrogendodecawolframate used forms a clear solution with said component. The same applies to lithium. Strontium or barium may be used as an alkaline-earth metal.

A preferred oxidant from the point of view of easy availability and effect is potassium dichromate, sodium dichromate or potassium permanganate, it also being possible to use other effective oxidants. $H_2O_2$ as such is not a satisfactory oxidant for the object according to the invention since, as is known, it easily disproportionates. It is at best suitable for neutralizing a pale blue tinting but not for long-term prevention of deep blue turbidity.

The oxidant is present in a concentration of 0.05 to 0.5% by weight relative to the quantity of the salt of wolframate, advantageously in a concentration of 0.1 to 0.3% by weight relative to the quantity of sodium wolframate. With concentrations below 0.05% by weight, inadequate stabilization occurs and concentrations above 0.5% by weight do not produce an improved effect.

The stabilized dihydrogendodecawolframate solution according to the invention is surprisingly totally stable relative to metal constituents and does not present decomposition properties like the non-stabilized dihydrogendodecawolframate solution. The latter is admittedly suitable for separating mineral constituents but, when it is in contact with, for example, metals such as iron, aluminium, tin etc., it immediately presents a deep blue clouding and is therefore no longer suitable for further use as a density separation agent. Said clouding and decomposition is also substantially irreversible.

Since in technical processes for separating waste products, which may be substantially a mixture of plastics, glass and metal, but also already washed and granulated plastics materials, metal impurities are unavoidable, the use of pure dihydrogendodecawolframate solutions for density separation is not possible.

Said problem is totally solved by the invention, it being particularly advantageous if the stabilized solution of, for example, sodium dihydrogendodecawolframate is provided as a solution of differing density having gradations from 0.005 to 0.1 g/cm$^3$ in the density range of 1.01 to 2.9 /cm$^3$, preferably having gradations from 0.01 to 0.05 g/cm$^3$. Said gradations of sodium dihydrogendodecawolframate solutions may be used in order to bring a solids mixture, which is to be separated according to density, in said density range successively into contact therewith.

In the process according to the invention, after contact of the solids mixture with a separating liquid the floating or sinking solid component is removed after each stage. According to the invention it is advantageous if the solids mixture is brought successively into contact with the separating liquids of differing density in gradations of 0.005 g/cm$^3$ to 0.1 g/cm$^3$, preferably 0.05 g/cm$^3$ to 0.01 g/cm$^3$, within a selected region of the density range of between 0.8 and 2.9 /cm$^3$ and then the sinking solid component is removed after each stage.

It is then possible, according to a preferred embodiment of the invention, for said process to be practically converted into the form of an analytical process. Thus, a routine analysis is possible using separating liquid solutions having densities differing by 0.05 g/cm$^3$. A greater accuracy for e.g. an initial evaluation of a solids mixture is achieved using separating liquids having densities differing by 0.01 g/cm$^3$. Special information may then be obtained using separating liquids having densities differing by 0.005 g/cm$^3$, e.g. using a sodium dihydrogendodecawolframate solution. This means, e.g. for the routine analysis of a purely plastics mixture, that said mixture is brought successively into contact with a separating liquid of the density 1.05–1.10–1.15–1.20–1.25–1.30–1.35–1.40–1.45–1.50 and the sinking product is removed after each density stage. In the majority of cases, this is already enough to achieve a sufficient degree of accuracy for standard cases of separation and at the same time provide a fast analytical process.

The same analytical process for initial evaluation requires, for the same density range, 50 separating steps which however, given intensive wetting and the low-viscosity separating liquid, e.g. sodium dihydrogendodecawolframate, in said density range may likewise be effected relatively quickly. Wetting may be effected by agitation or ultrasonically; given significant adhesive or oil pollution in the solids mixture, it is also possible to have recourse to organic wetting agents although this should generally be avoided.

In said manner, in an initial evaluation of a plastics/glass/metal mixture said mixture may advantageously be successively brought into contact in density gradations of 0.01 g/cm³ in the density range of 0.8 to 0.99 g/cm³ with an aqueous propanol solution and in the density range of 1.01 or 1.005 to 2.90 g/cm³ with an aqueous sodium dihydrogendodecawolframate solution. Depending on the yield of corresponding fractions, said fractions are removed, washed and dried. They may, if necessary, be subjected to further analytical processes, though in most cases allocation to the known plastics densities is sufficient, and both qualitative and precise quantitative information may thereby be obtained. Said information is sufficient, given commercial application of the process according to the invention, to enable subsequent definition of the precise separating cuts for the desired plastics or metals which are to be separated, e.g. to enable for the types of plastics materials differentiation according to the field of application and region- or district-specific production.

The charge quantity for the solids mixture for an analytical process is approximately 5 to 50 g, preferably 10 to 20 g.

In a preferred process variant, the separating liquids of differing density are successively introduced into a container containing the solids mixture and after the separating process are supplemented, adjusted to a new density or totally removed. Said procedure leads to substantial savings compared to the previously standard cascade process, in which a plastics mixture was successively transferred into a plurality of containers holding liquids of differing density. It is particularly advantageous that the residual separating liquid, some of which is removed with the sinking product, remains in the separating container and that the next density stage is adjusted by adding separating liquid of a suitable density.

As already stated, the process may be implemented in such a way that the floating solid component is removed after contact with the separating liquid. Implementation of the process according to the invention is however preferably also possible when, starting with a high density of the heavy-medium solution (all solids float), the product which sinks during the next, lower density stage is removed.

Given suitably designed apparatus, the present process may also be implemented as a commercial separation process for bulk yields arising from the recycling of plastics or electrical scrap (including glass components). Thus, for example, polystyrene, PVC and polyethylene terephthalate (PET) may easily be cleanly separated using the present process in that separating cuts determined after preliminary density fraction analysis are laid at the desired density stages with the aid of the separating liquids, in particular a stabilized sodium dihydrogendodecawolframate solution, and the sinking products which then arise are removed as a desired fraction. Thus, for example, polystyrene, polyamides, polycarbonate, polyethylene terephthalate, polyoxymethylene but also reinforced plastics, e.g. glass-fibre reinforced plastics, may easily be cleanly separated using the present process in that separating cuts determined after preliminary density fraction analysis are laid at the desired density stages with the aid of the separating liquid, in particular a stabilized sodium dihydrogendodecawolframate solution, and the sinking products (or floating products) which then arise are removed as a desired fraction. Determining the separating cuts presents no problem owing to the very close fractionation with densities to the second or third decimal place.

A further advantageous embodiment of the process consists of plastics mixtures, whose densities either lie very close together or are superimposed, being treated as part of the solids mixture with a suitable solvent, which for at least one plastics contained therein is a swelling solvent and effects an increase in volume so that, as a result of the reduction in density, the swollen or partially swollen plastics material is brought into contact with water or with the separating liquid having a gradation in density of at least 0.01 g/cm³ and the floating or sinking plastics component is removed. It thereby becomes possible to determine with greater accuracy even such unclear fractions from the normal density fraction analysis (e.g. initial evaluation). The solvents are to be selected in accordance with the type of plastics material. It is likewise expedient to determine the adequate swelling time.

The stabilized alkaline or alkaline-earth metal dihydrogendodecawolframate solution as a separating liquid may be easily regenerated by a regenerating step with regard to the used oxidant by adding fresh oxidant. When implementing the process according to the invention, such regeneration is necessary surprisingly only after an extended period, i.e. the added oxidant retains its up till now not yet fully explained effectiveness to a still relatively satisfactory extent even after intensive use of the heavy-medium solution, e.g. over several months.

A further advantageous embodiment of the process relates to the density separation of electrical scrap. By electrical scrap, in the context of the present process, is meant scrap from electrical appliances, salvaged cable and so-called electronic scrap (printed-circuit boards, telephones, electronic components etc.). Using the present process, problem-free separation of plastics parts into individual fractions, glass and metal fractions may be achieved, with it even being possible for various metals such as aluminium and copper, which have clearly distinct densities, to be separately obtained as a fraction.

The particle size for the present process is 0.1 to 80 mm. The preferred range of particle size is 1 to 8 mm. With particle sizes below 0.1 mm, problems arise with regard to the settling rate in the separating medium and parts greater than 80 mm in diameter, i.e. with surface areas of up to 10 cm², while being generally separable do entail obstructions upon discharge from the separating vessels.

The invention further relates to a device for wet separation of solids mixtures of differing density. In said device, the separation chamber is filled with a separating liquid, the density of the separating liquid at the start of the separation process being adjusted, for example, in such a way that all of the constituents of the feed material float. A material mixture, comprising comminuted material insoluble in the separating liquid and having a particle size of around 1 to 5 mm, which is a mixture of plastics and metals, is charged into the separation chamber. After wetting of the material mixture by agitation or ultrasonically or in some other conventional way, gravity separation of the material is effected within a short time. By opening a bottom flap, the settled sinking fraction is conveyed with some of the separating liquid into the settling chamber situated below. Said conveying action may be assisted by an additional agitating element or some other suitable device such as, for example, an inclined surface plane.

The sinking fraction situated in the settling chamber is removed from the residual separating liquid by means of a screen or centrifuge, washed and then dried. The resultant yield of separating liquid is recycled, as is the washing water, possibly after concentration. Fresh separating liquid is added to the floating fraction situated in the separation chamber and a new density is adjusted. The new sinking fraction possibly then produced is separated in the same manner as described above.

The process may advantageously be implemented in a device, in which a plurality of sector-shaped settling chambers are situated below a cylindrical separation chamber. It may however also be implemented with a cone-shaped separation chamber, below which only one settling chamber is disposed.

For analytical purposes it is advantageous if the separation device is operated at a constant temperature, i.e. a medium controlled by a thermostat is, for example, directed into a jacket around the device and maintains a constant temperature.

The operating sequence of the separating process is advantageously controlled by microprocessor. Said type of control allows adjustment of the density of the separating liquid through the dosed addition of an auxiliary liquid to the separating liquid and as a result of the dosing accuracy guarantees a high separation efficiency. In the process, by measuring the density of the separating liquid the dosage quantity of the auxiliary liquid is determined and the predetermined quantity of said auxiliary liquid is added to the main separating liquid. The auxiliary liquid may be water or the same separating liquid with a different density.

In a further embodiment, the separating liquid having the respective predetermined density relative to the virtually liquid-free material to be separated is introduced into the separation chamber, the liquids of differing density being carried in separate circulation systems and being adjusted to a desired density both through dilution with auxiliary liquid and through concentration of the separating liquid.

The separation times themselves are not critical and may be from 0.1 to 100 seconds, preferably 0.5 to 30 seconds, in particular 0.5 to 10 seconds.

BRIEF DESCRIPTION OF THE DRAWINGS

There follows a detailed description of the invention with reference to embodiments. The accompanying drawings show.

DETAILED DESCRIPTION OF PREFERRED EMBODIMENTS

Figure 9:
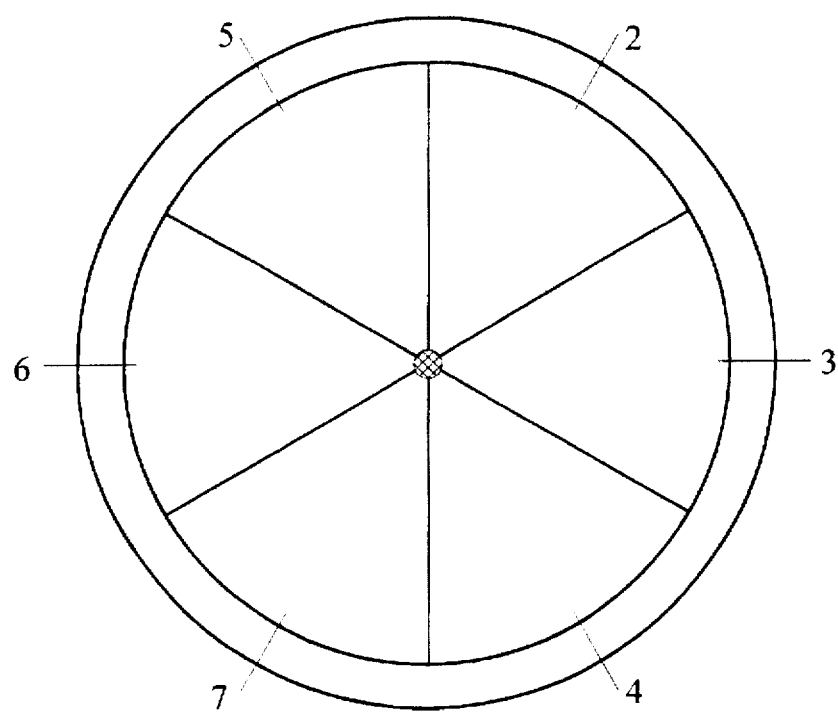
Figure 8:
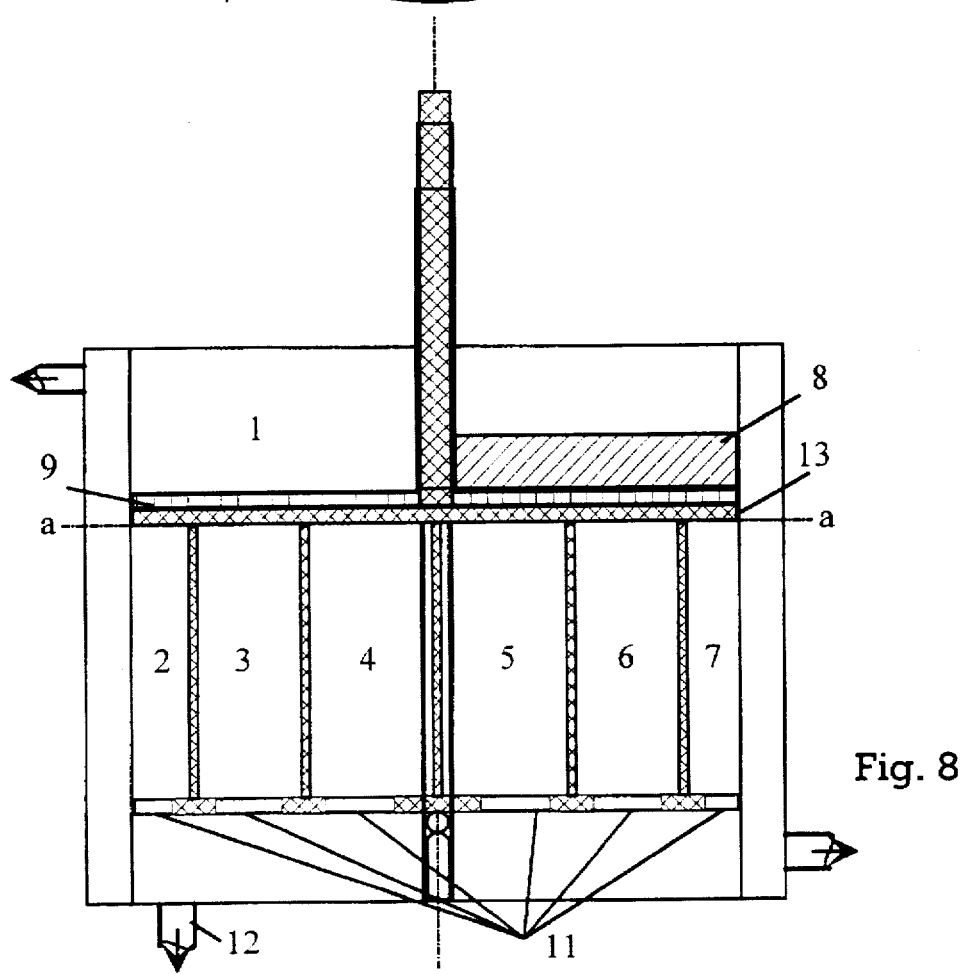

In a first embodiment of the device according to FIGS. 8 and 9, the separation chamber 1 comprises a body in the form of a cylinder. The cylinder is separated from settling chambers 2 to 7 situated below by two rotating disks 9 and 13, which are displaceable relative to one another, the disks having an opening which is not larger than the opening of each settling chamber towards the separation chamber situated above. In a special embodiment, a scraper 8, which is driven by a central rotor 10 and moves over the disk in the separation chamber, may be provided for complete removal of the sinking fraction from the separation chamber. The settling chambers may be emptied through openings 11 at the bottom or in the bottom plane. Separating liquid may be removed through the piping 12.

EXAMPLE 1

The sinking product from the water sink-float separation of plastics waste (hollow bodies) was used as a starting product for said example. Three equivalent samples each weighing 10 g and having a particle size of 0.315 to 8.0 mm were used. Separation of the plastics mixture was effected in that the mixture situated in a separation chamber was successively brought into contact with in each case 250 ml of a sodium dihydrogendodecawolframate solution having densities differing in steps of 0.05 g/cm$^3$ in the density range of 1.05 to 1.5 g/cm$^3$. Thus, 12 density separation stages were implemented, including the separation using water and using alcohol/water. The fractions having a density difference of 0.05 g/cm$^3$ were removed, washed and dried. Evaluation of the density spectra determined a content of 0.5% polyolefins, 9% polystyrene, 89% PVC/PET and 2% of a residual fraction comprising aluminium and aluminium/plastics composites. The values of the 3 samples were very close to one another so that the error of said analysis may be regarded as very low.

EXAMPLE 2

20 g of a previously separated aluminium/plastics mixture was washed and subjected to fractionation with sodium dihydrogendodecawolframate solutions having densities differing in steps of 0.05 g/cm$^3$ in the density range of 0.05 to 2.70 g/cm$^3$. The mixture used had a particle size of 0.315 to 3.0 mm.

Figure 3:
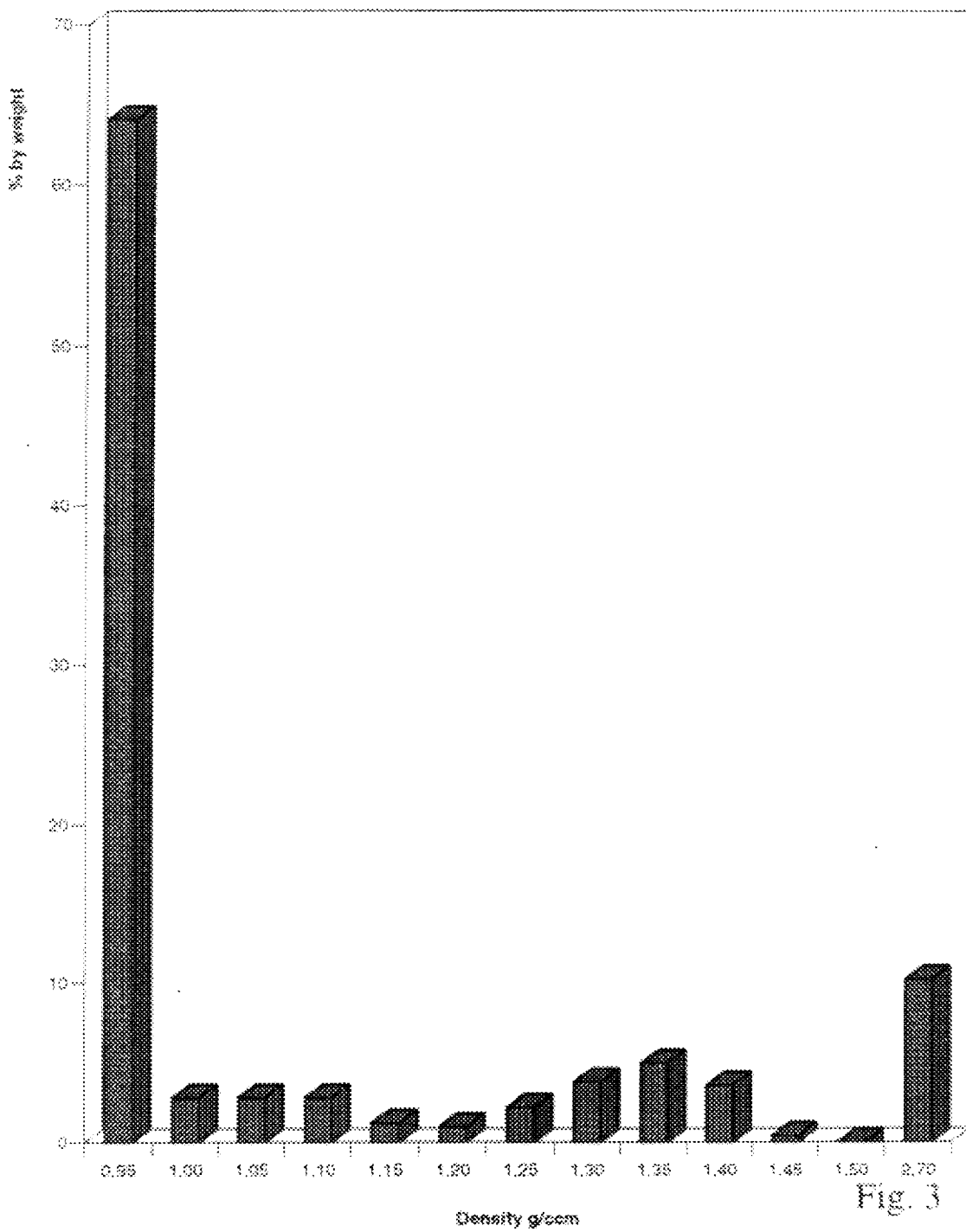

According to FIG. 3 it is apparent that primarily polyethylene and secondly PVC/elastomer is present as insulating and sheath materials in said example. The yield of recovered aluminium is around 10% by weight (relative to the weighed quantity of 10 g of mixture).

EXAMPLE 3

Figure 4:
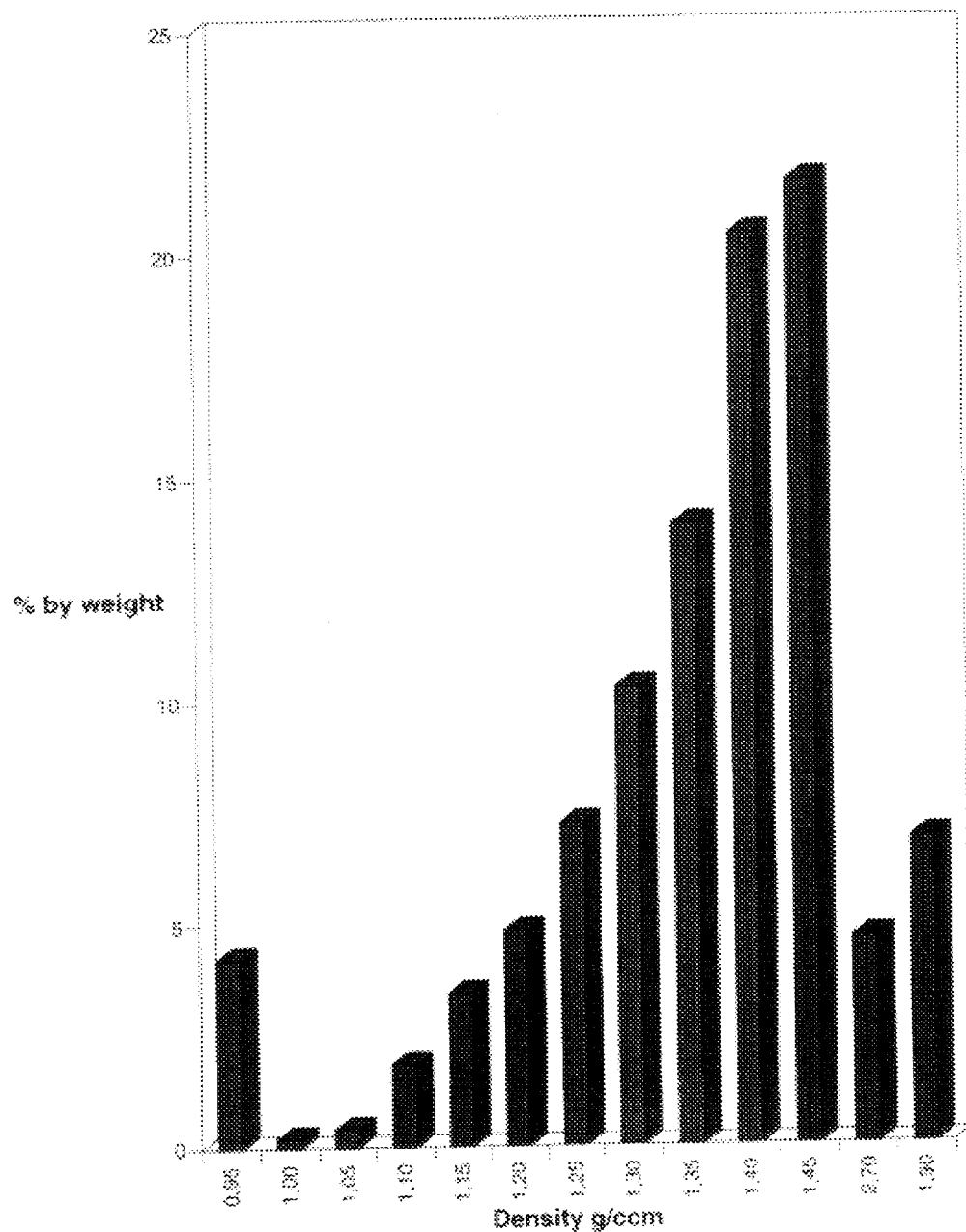

20 g of a previously separated aluminium/copper/plastics mixture from mixed cable separation was washed and subjected to fractionation with sodium dihydrogendodecawolframate solution having a density differing in steps of 0.05 g/cm$^3$ in the density range of 0.95 to 2.90 g/cm$^3$. From FIG. 4 it is apparent that primarily PVC/elastomer and secondly polyethylene are present as insulating and sheath materials in said example. The yield of recovered aluminium is around 4.7% by weight and of recovered copper around 7% by weight (relative to the weighed portion of 20 g of mixture).

REFERENCE EXAMPLE 1

A model mixture, comprising 30% by weight polystyrene, 20% by weight styrene-acrylonitrile polymer (SAN) and 25% by weight each of acrylonitrile-butadiene styrene (ABS) (I) and ABS (II) of different manufacturers, was subjected to density fraction analysis. Two equivalent samples of said mixture, each weighing 5 g and having a particle size of 1 to 5 mm, were taken (sample A and sample B).

a) In a similar manner to the other examples, sample A was brought into contact with separating liquids, said solutions having the following densities:

| Stage | Separating liquid | Density [g/cm$^3$] |
|---|---|---|
| 1 | water | 1.00 |
| 2 | aqueous sodium dihydrogen-dodecawolframate solution | 1.05 |
| 3 | aqueous sodium dihydrogen-dodecawolframate solution | 1.10 |
| 4 | aqueous sodium dihydrogen-dodecawolframate solution | 1.15 |

Figure 2A:
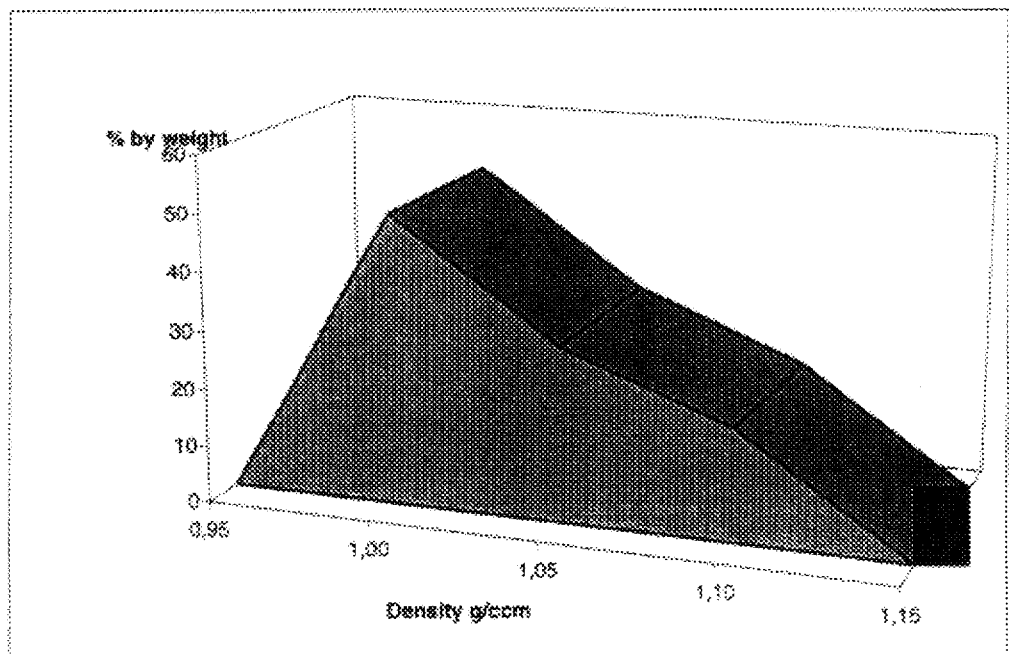

The sinking fraction at each stage was removed, washed, dried and its mass determined. The result obtained was a percentage distribution of the masses in the individual density stages according to FIG. 2a.

b) In a similar manner to the other examples, sample B was brought into contact with separating liquids, said solutions having the following densities:

| Stage | Separating liquid | Density [g/cm$^3$] |
|---|---|---|
| 1 | water | 1.00 |
| 2 | aqueous sodium dihydrogen-dodecawolframate solution | 1.01 |
| 3 | aqueous sodium dihydrogen-dodecawolframate solution | 1.02 |
| 4 | aqueous sodium dihydrogen-dodecawolframate solution | 1.03 |
| 5 | aqueous sodium dihydrogen-dodecawolframate solution | 1.04 |
| 6 | aqueous sodium dihydrogen-dodecawolframate solution | 1.05 |
| 7 | aqueous sodium dihydrogen-dodecawolframate solution | 1.06 |
| 8 | aqueous sodium dihydrogen-dodecawolframate solution | 1.07 |
| 9 | aqueous sodium dihydrogen-dodecawolframate solution | 1.08 |
| 10 | aqueous sodium dihydrogen-dodecawolframate solution | 1.09 |
| 11 | aqueous sodium dihydrogen-dodecawolframate solution | 1.10 |
| 12 | aqueous sodium dihydrogen-dodecawolframate solution | 1.11 |

Figure 2B:
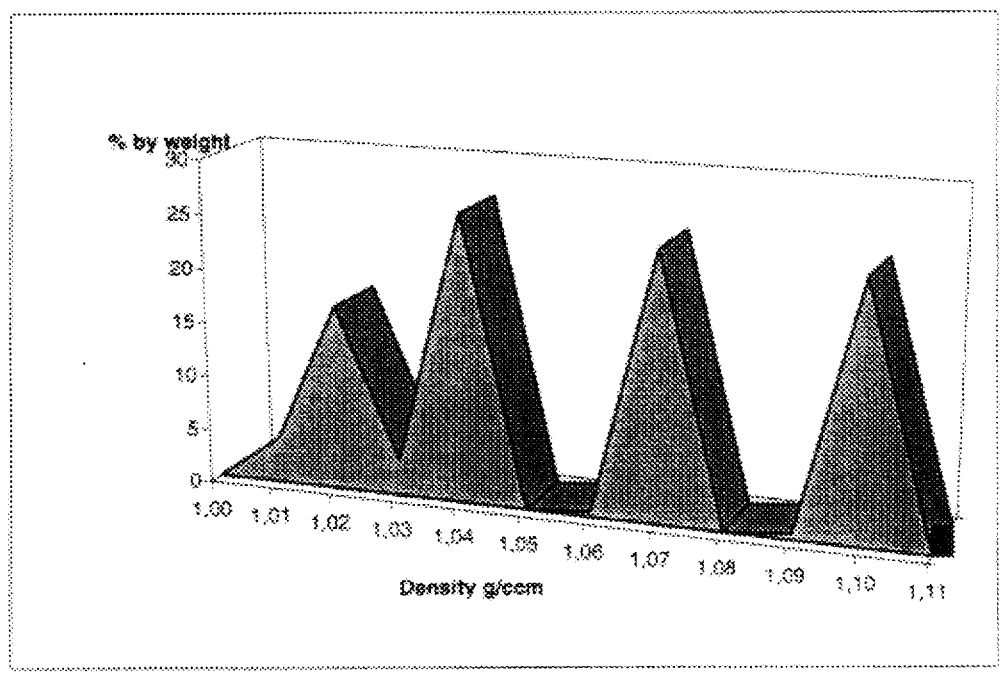

The sinking fraction at each stage was removed, washed, dried and its mass determined. The result obtained was a percentage distribution of the masses in the individual density stages according to FIG. 2b.

From said example it is evident that the separation results obtained with density steps of 0.05 g/cm$^3$ are not sufficient for an accurate characterization of the plastics mixture. Only a dissolution with densities of 0.01 g/cm$^3$ presents maximum values at 1.02–1.04–1.07–1.10 g/cm$^3$ which indicate the presence of different plastics (SAN, PS, ABSI, ABSII). By said means, an almost 100% grade purity after separation of said mixture was achieved.

Fractionation was effected first with sodium dihydrogendodecawolframate solutions of a density differing in steps of 0.05 g/cm$^3$. The results are shown in FIGS. 11 and 12. It is apparent that it was impossible to achieve total separation of the model mixture.

The same model mixture was then analyzed using sodium dihydrogendodecawolframate solution with density steps of 0.01 g/cm$^3$ and an almost 100% grade purity after separation of said mixture was thereby achieved.

EXAMPLE 4

Figure 5:
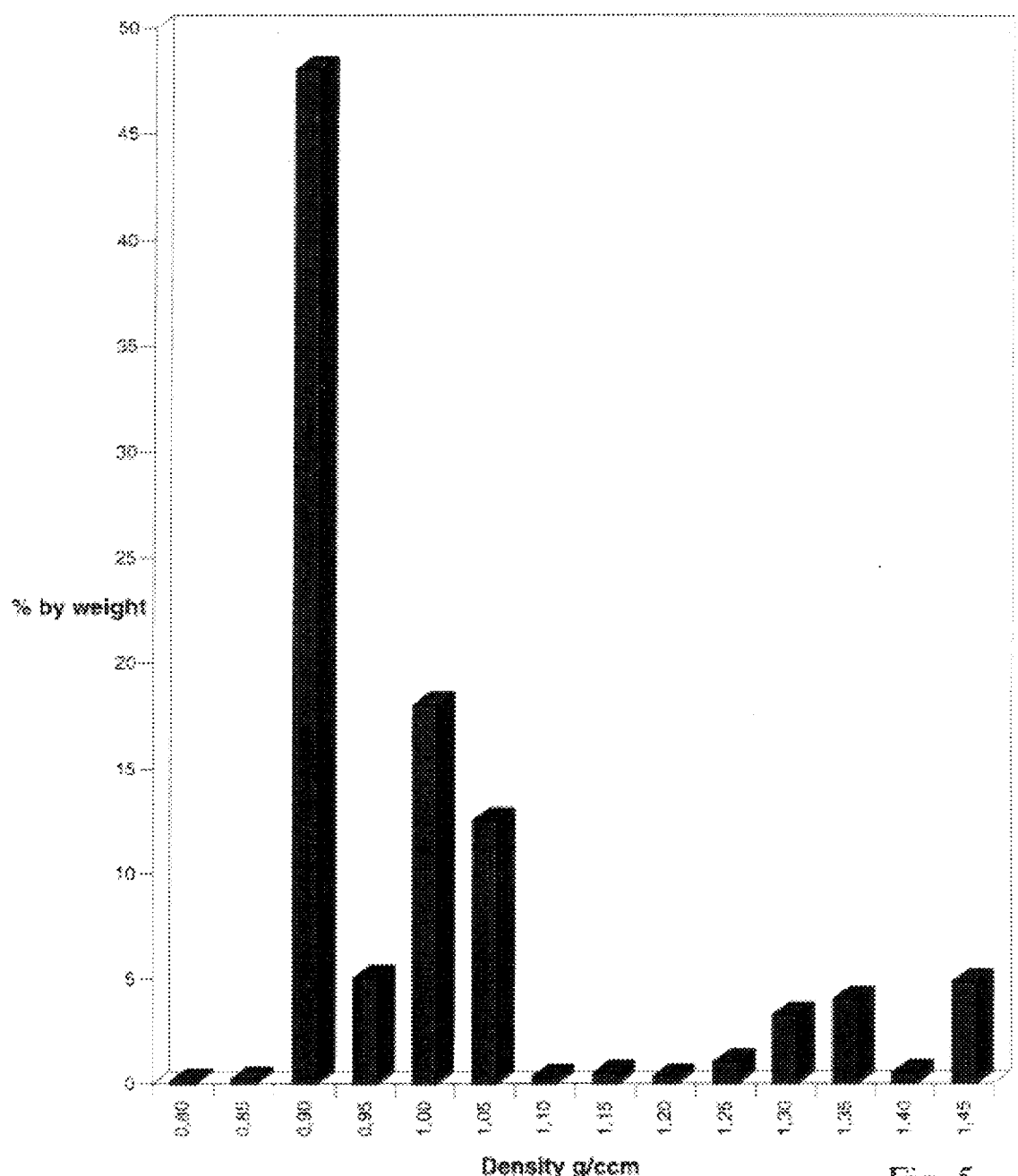

500 g of hand-separated plastics packaging (tubs) having a particle size of 0.315 to 8.0 mm was used. Fractionation of the mixture was effected with a sodium dihydrogendodecawolframate solution, starting with the density 1.45 g/cm$^3$. Fractionation was effected with the density falling to the density 1.01 and then using water or a water/alcohol solution to a density of 0.80 g/cm$^3$. The fractions thereby obtained were washed, dried and gravimetrically determined. Evaluation was effected by a computer and produced the plastics distribution shown in FIG. 5.

EXAMPLE 5

To determine the separability and the useful material content of electrical scrap (printed-circuit boards, connectors), a density fraction analysis according to the invention was carried out. The particle size of the sample material was 0.2 to 2.0 mm.

Figure 6:
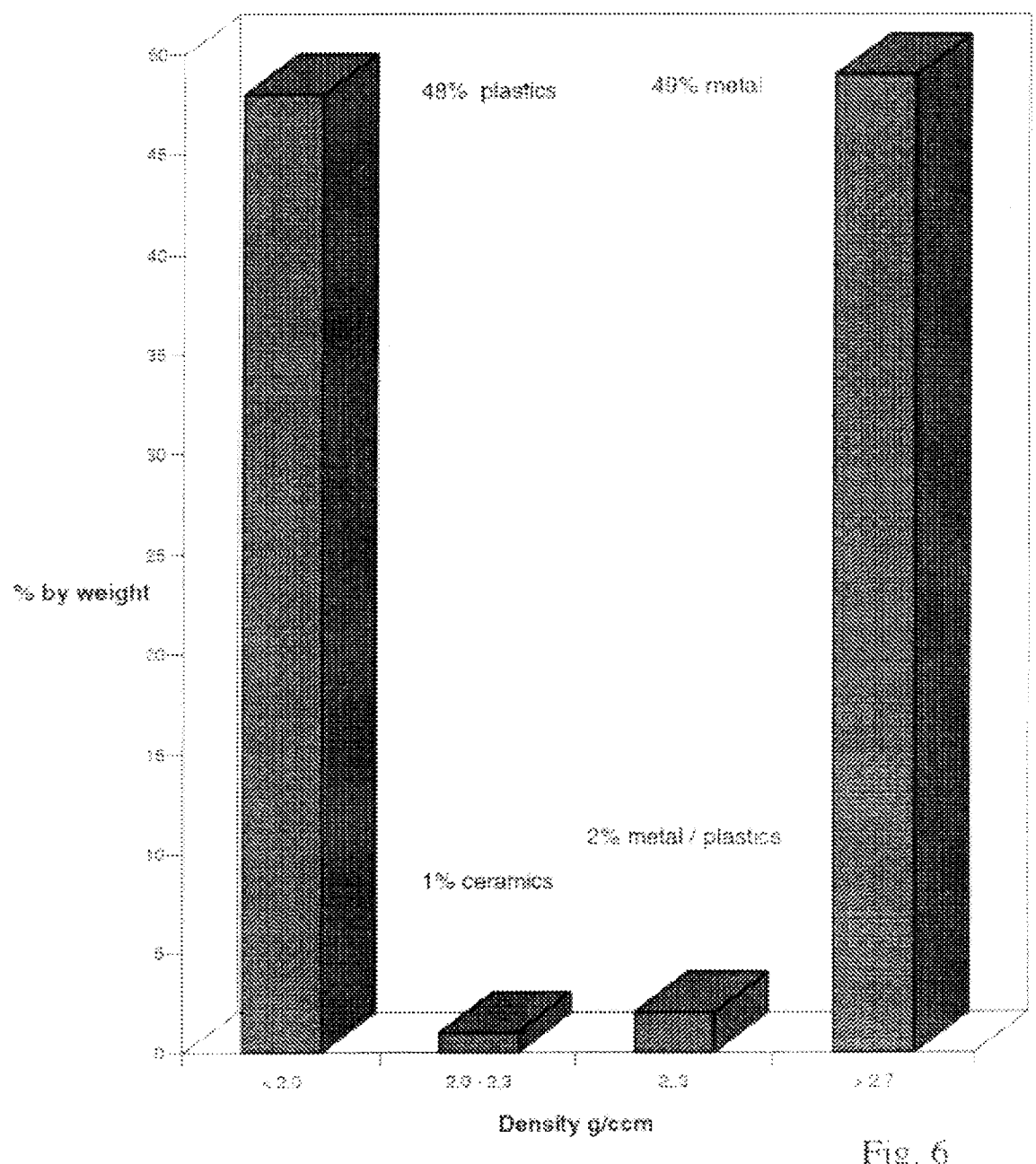
FIG. 6 density fraction analysis according to the main components of electrical scrap (general analysis)
Figure 7:
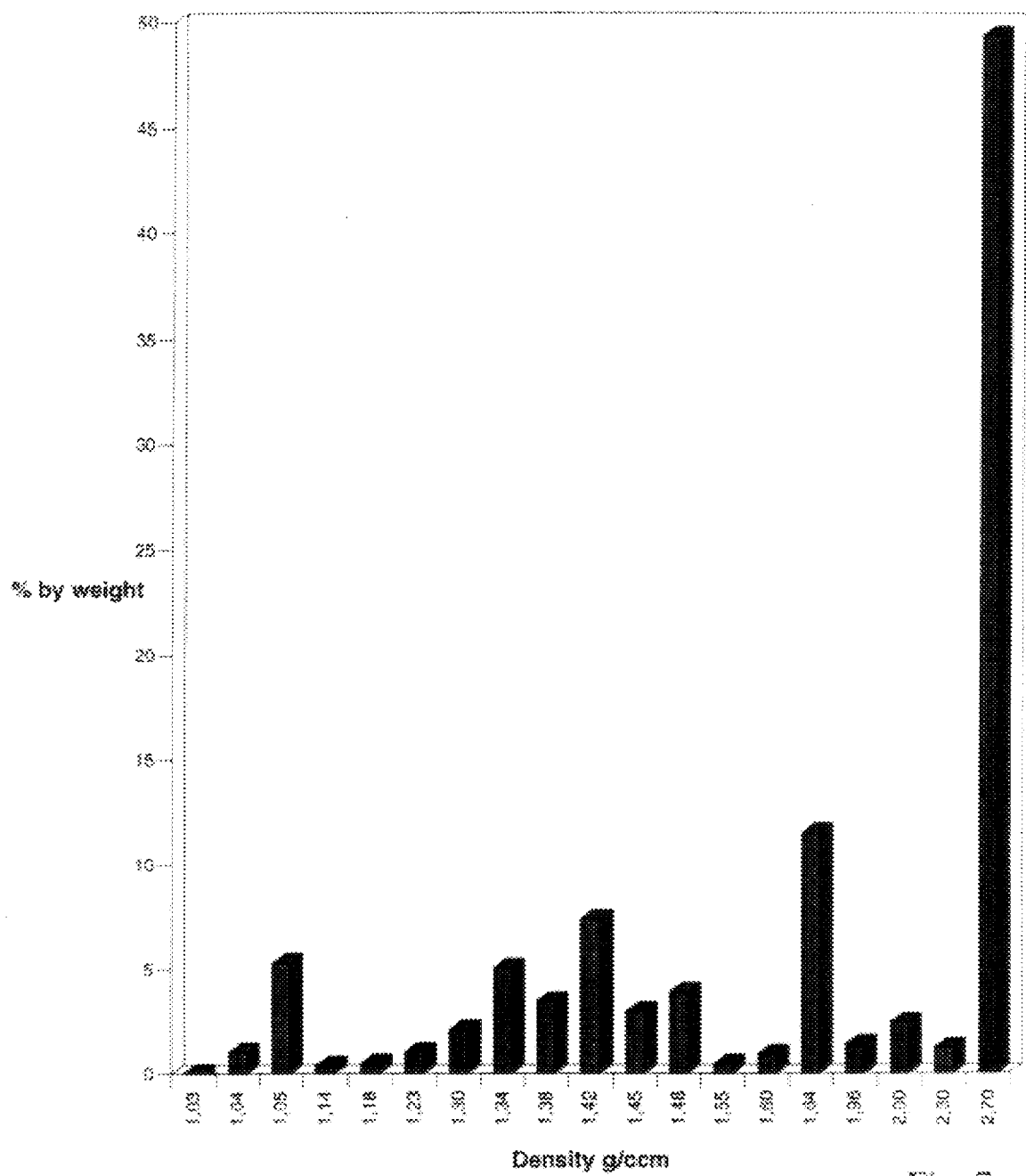
FIG. 7 bar chart of the density fraction analysis according to all components of an electrical scrap sample having the density dissolution 0.01 g/cm$^3$ FIG. 8 side view of a first embodiment of the device FIG. 9 top view of FIG. 8.

15 g of the comminuted electrical scrap was introduced into the separation chamber and fractionation was effected with a falling density, starting with a density of 2.7 g/cm$^3$ and ending with a density of 1.03 g/cm$^3$. The metal/plastics separation was effected at the density of 2.7 g/cm$^3$, 7.33 g (49% by weight) of metals being separated. Further sample components were separated in the density range of 2.3 to 2.7 g/cm$^3$ (metal/plastics composites, 2% by weight) and 2.0 to 2.3 g/cm$^3$ (ceramics, 1% by weight). A general view of the sample components is shown in FIG. 6.

EXAMPLE 6

To determine the separability and the useful material content of electrical scrap (printed-circuit boards) a density fraction analysis according to the invention was carried out. The particle size of the sample material was 0.5 to 3.0 mm.

Figure 1:
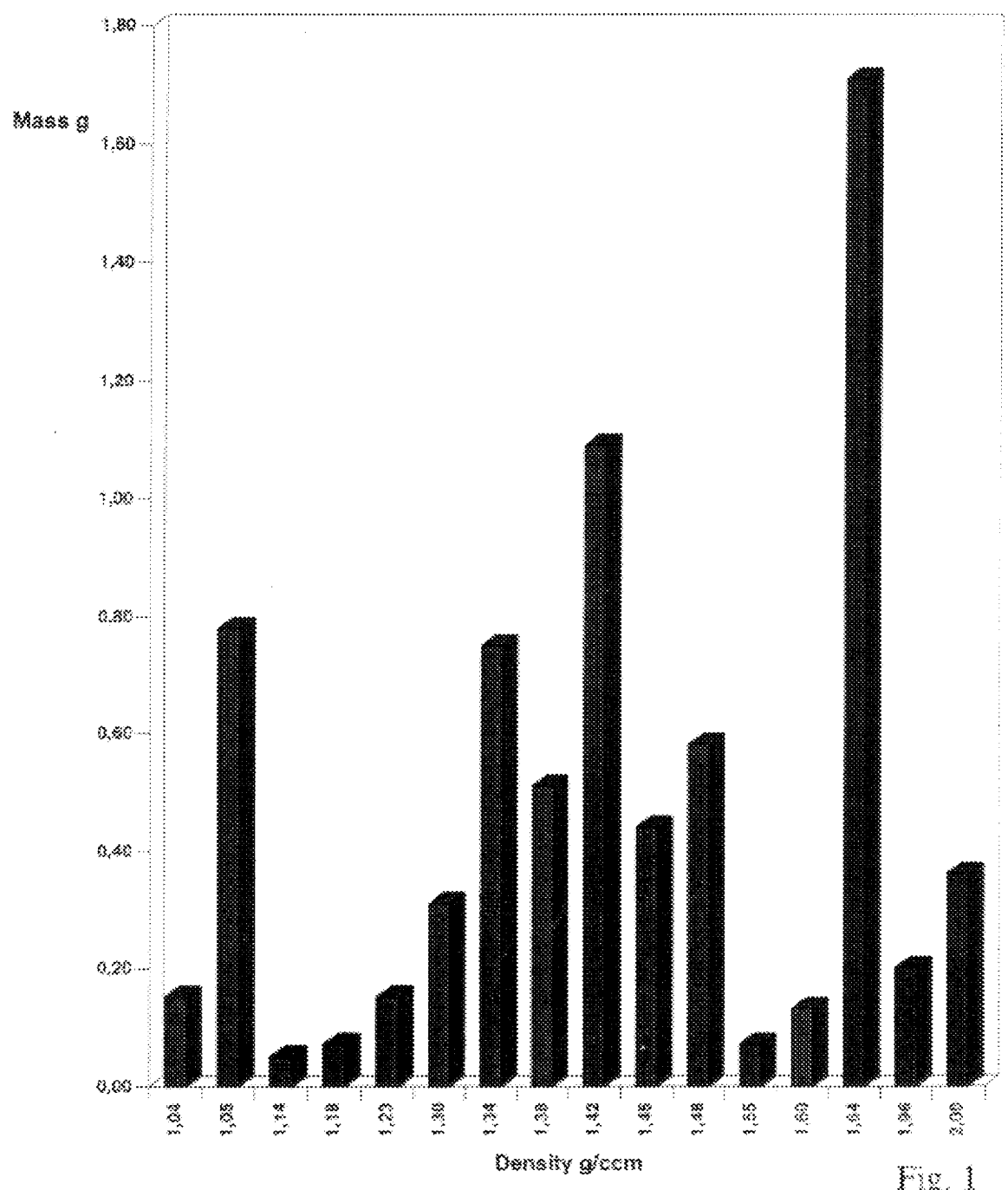
FIG. 1 diagram of a density fractionation of the plastics material content of electrical scrap FIG. 2a diagram of the density fraction analysis of polystyrene plastics materials with the dissolution 0.05 g/cm$^3$ FIG. 2b diagram of the density fraction analysis of polystyrene plastics materials with the dissolution 0.01 g/cm$^3$ FIG. 3 bar chart of a density fraction analysis of an aluminium/plastics mixture FIG. 4 bar chart of a density fraction analysis of an aluminium/copper/plastics mixture FIG. 5 bar chart of a density fraction analysis of a plastics mixture comprising packaging materials (tubs)

15 g of the comminuted electrical scrap was introduced into the separation chamber and fractionation was effected with a falling density, starting with a density of 2.7 g/cm$^3$ and ending with a density of 1.045 g/cm$^3$. The separation of metals and lighter components including aluminium was effected at the density of 2.7 g/cm$^3$, 7.507 g (50.59% by weight) of metals being separated. The results of the plastics fractionation according to density were obtained in a similar manner to Example 4. An allocation of the fractions according to material was effected with the aid of pyrolytic gas chromatography. The graph of the fractions below the density of 2.0 is shown in FIG. 1.

We claim:

1. Stabilized heavy medium composition for the density separation of metal-containing, non-mineral waste products belonging to the group of plastics, glass and electrical scrap and mixtures thereof, comprising
an aqueous solution of:
(1) an alkali metal salt or an alkaline-earth metal salt of dihydrogendodecawolframate having a concentration in the range of 1% to 80% by weight based upon the total solution weight; and
(2) an oxidant selected from the group consisting of the chromate, dichromate, permanganate, nitrate, peracids, perester group, having a concentration of 0.05% to 0.5% by weight based upon the weight of the salt of dihydrogendodecawolframate.

2. Heavy medium composition according to claim 1, wherein the alkali metal salt is selected from the group consisting of sodium and lithium.

3. Heavy medium composition according to claim 1, wherein the alkali metal salt is sodium.

4. Heavy medium composition according to claim 1, wherein the oxidant is selected from the group consisting of potassium dichromate, sodium dichromate and potassium permanganate.

5. Heavy medium composition according to claim 1, comprising a solution of differing density in incremental amounts of 0.005 to 0.1 g/cm$^3$ in a density range of 1 to 2.9 /cm$^3$.

6. Heavy medium composition according to claim 1, comprising a solution of differing density in incremental amounts of 0.01 to 0.05 g/cm$^3$ in a density range of 1 to 2.9 /cm$^3$.

7. Process for separating mixtures of solids of differing density comprising:

bringing a mixture of comminuted solids having a particle size range of from 0.1 to 80 mm, into contact in several stages with aqueous solutions of separating liquids of differing density;

separating floating solid components from sinking solid components after each stage by a density separation;

effecting said density separation in incremental steps of 0.005 g/cm$^3$ to 0.1 g/cm$^3$ within a selected region of a density range of 0.8 to 2.9 g /cm$^3$;

using an aqueous separating liquid in a density range of 1.01 to 1.16 g/cm$^3$ which is a urea solution; or using an aqueous separating liquid in a density range of 1.01 to 2.9 g/cm$^3$ which is a stabilized heavy-medium solution, comprising:

(1) an alkali metal salt or an alkaline-earth metal salt of dihydrogendodecawolframate having a concentration in the range of 1% to 80% by weight based upon the total weight; and (2) an oxidant, selected from the group consisting of the chromate, dichromate, permanganate, nitrate, peracids, perester group, having a concentration of 0.05 to 0.5% by weight based upon the weight of the salt of dihydrogendodecawolframate.

8. Process according to claim 7, comprising separating non-mineral, metal-containing mixtures of solids, by using said separating liquid.

9. Process according to claim 7, comprising successively introducing separating liquids of differing density into a container, which contains the solids mixture, and after each separation step is completed, then supplementing and adjusting said liquids to a new density or completely removing said liquids.

10. Process according to claim 7, comprising removing sinking solids component after contact with the separating liquid.

11. Process according to claim 7, further comprising providing a coarse preliminary separation;

after said coarse preliminary separation, plastics whose densities lie close together or are superimposed are treated as part of the mixture of solids with a solvent, which for at least one of the plastics material contained therein is a swelling solvent and effects an increase in the volume of said plastics material;

then bringing the plastics material, which as a result of the reduction in density has swollen or partially swollen, into contact with water or with the separating liquid having a gradation in density of at least 0.01 g/cm$^3$; and removing the floating or sinking plastics component.

12. Device for the wet separation of mixtures of solids of differing density, comprising a body having a separating chamber;

settling chambers and said separating chamber which is separated from said settling chambers situated below by two disks;

said two disks are displaceable relative to one another, and the disks having an opening which is not larger than a top opening of each settling chamber;

a rotor centrally in the body;

a scraper and the rotor is firmly connected to said scraper; and bottom flaps in the settling chambers.

* * * * *